United States Patent [19]
Whitsitt

[11] Patent Number: 5,805,742
[45] Date of Patent: Sep. 8, 1998

[54] OBJECT DETECTION SYSTEM WITH MINIMUM-SPANNING GRADIENT FILTER FOR SCENE CLUTTER SUPPRESSION

[75] Inventor: Stephen J. Whitsitt, Manhattan Beach, Calif.

[73] Assignee: TRW Inc., Redondo Beach, Calif.

[21] Appl. No.: 624,304

[22] Filed: Aug. 16, 1995

[51] Int. Cl.$^6$ .............................. G06K 9/40; G06K 9/00
[52] U.S. Cl. ...................... 382/275; 382/103; 250/203.6
[58] Field of Search ................... 382/103, 278, 382/275, 260; 342/352; 348/169; 250/203.6, 332, 342, 339.14

[56] References Cited

U.S. PATENT DOCUMENTS

| | | | |
|---|---|---|---|
| 3,638,025 | 1/1972 | Dishington et al. | 382/103 |
| 4,739,401 | 4/1988 | Sacks et al. | 382/103 |
| 4,937,878 | 6/1990 | Lo et al. | 382/103 |
| 5,061,934 | 10/1991 | Brown et al. | 342/162 |
| 5,150,426 | 9/1992 | Banh et al. | 382/103 |
| 5,185,526 | 2/1993 | Reitman et al. | 250/332 |
| 5,245,677 | 9/1993 | Lepore et al. | 382/272 |
| 5,257,121 | 10/1993 | Steinberg | 358/447 |
| 5,267,329 | 11/1993 | Ulich et al. | 382/103 |
| 5,280,289 | 1/1994 | Root | 342/91 |
| 5,291,563 | 3/1994 | Maeda | 382/103 |
| 5,300,780 | 4/1994 | Denney et al. | 250/342 |
| 5,341,439 | 8/1994 | Hsu | 382/103 |
| 5,371,542 | 12/1994 | Pauli et al. | 348/262 |
| 5,386,480 | 1/1995 | Lo et al. | 382/103 |
| 5,394,520 | 2/1995 | Hall | 395/135 |
| 5,430,445 | 7/1995 | Peregrim et al. | 342/25 |
| 5,491,487 | 2/1996 | Gerlach | 342/378 |
| 5,495,257 | 2/1996 | Loomis | 342/357 |
| 5,497,435 | 3/1996 | Berger | 382/249 |
| 5,546,084 | 8/1996 | Hindman | 342/25 |

OTHER PUBLICATIONS

Hulsmann, J.D. and Barry, P.E., "An Eigenvector Procedure for Eliminating Line-of-Sight Jitter Induced Noise from Staring Mosaic Sensors", 19th Annual Asilomar Conference on Circuits, Systems and Computers, Pacific Grove, CA, Nov. 6–8, 1985.

*Primary Examiner*—Yon Couso
*Assistant Examiner*—Jayanti K. Patel
*Attorney, Agent, or Firm*—Michael S. Yatsko

[57] ABSTRACT

A minimum-spanning gradient filter used to suppress clutter in a target detection and tracking system. The minimum-spanning gradient filter uses subspace projection clutter suppression techniques, but does not require eigenanalysis. Model frames of data from a sensor array are stored in a memory in which the model frames do not include targets that are being detected. At start-up, a Gram-Schmidt system generates a series of unit vectors that define a clutter subspace where most of the clutter in the model frames will reside. Current frames of data from the sensor array and unit vectors from the Gram-Schmidt system are applied to a subspace projection system that removes the clutter subspace from the current frames of data. Once the original clutter subspace has been generated, a plane smoothing system updates the clutter subspace as new frames of data are added to the model frames. Current frames of data sent to the subspace projection system are centered. Additionally, a standard deviation for the pixel intensities in each frame of data is applied to a standard deviation threshold to prevent pixels that fall below the threshold from being updated in the clutter subspace. A glint threshold detector is provided to eliminate pixels above a predetermined glint threshold so that they do not contribute to the updated clutter subspace.

25 Claims, 7 Drawing Sheets

OBJECT DETECTION SYSTEM WITH MINIMUM-SPANNING GRADIENT FILTER FOR SCENE CLUTTER SUPPRESSION

BACKGROUND OF THE INVENTION

1. Field of the Invention

This invention relates generally to a clutter suppression technique for suppressing clutter in an object detection and tracking system and, more particularly, to an object detection system that includes a clutter suppression technique for suppressing line-of-sight jitter induced clutter noise where the technique incorporates subspace projection, but does not require eigenanalysis.

2. Discussion of the Related Art

Strategic and tactical target detection systems which detect targets of interest and then track their courses are known in the art. These detection and tracking systems include ground-based and air-based systems that detect and track strategic objects such as aircraft, missiles, motor vehicles and the like. One such detection and tracking system is disclosed in U.S. Pat. No. 5,300,780 issued to Denney et al., titled MISSILE SURVEILLANCE METHOD AND APPARATUS and assigned to the Assignee of the instant invention, herein incorporated by reference. This patent discloses a missile launch detection and tracking system that performs missile detection and tracking from a satellite orbiting the earth. The detection and tracking system incorporates an infrared sensor which detects infrared radiation being emitted from the earth's surface and from target objects and clutter. The sensor includes a series of detectors where each detector absorbs energy from a particular area or scene of the earth's surface. The detectors will absorb energy of differing intensities for each wavelength within the frequency range of the sensor from the emissions of the objects in the scene. The different background clutter objects, such as clouds, and the objects of interest, such as missiles, will emit infrared energy intensities at the different wavelengths within the frequency range being sensed. Detector outputs are sampled and converted into picture elements (pixels).

The radiation received by the sensor is sent through a series of color filters before the radiation impinges the detectors. In one possible implementation, the color filters separate the frequency range into a series of frequency bands where each band is a continuum of wavelengths. The filters are incorporated on a wheel such that as the wheel turns, each filter will receive the impinging radiation. The rotational speed and operation of the wheel is selected such that each filter receives the radiation for a predetermined period of time in order to set an integration time for each frequency band. In a single-band sensor, only one such filter is employed, without a wheel.

Target detection and tracking systems of the type discussed above must have a high degree of reliability in that the signal-to-noise ratio (SNR) must be of such a degree to significantly reduce or eliminate the number of missed target detections and false target detections. In other words, in order to be effective, the system must have a high probability of detecting a target when one is present, and preventing an indication of a target when none is present. Therefore, all target detection and tracking systems incorporate some type of clutter suppression technique or techniques to remove background clutter and noise that degrades the systems ability to isolate and detect the target or targets. For example, in the system described above, one background clutter suppression technique involves selecting the color filters and their corresponding integration times accordingly to increase the SNR between the background radiation received and the radiation received from the targets of interest.

The most prevalent form of background clutter, especially for satellite based staring sensors, is caused by line-of-sight (LOS) motion. LOS clutter noise typically occurs as a result of motion imperfections in the LOS control sensing system, and the drift of the satellite itself. Because the sensor is mounted on a movable platform, certain phenomena such as the natural resonance of solar panels associated with the satellite, thermal expansion and contraction of different components associated with the satellite, and, in some cases, inertial spinning masses that maintain the satellite's attitude cause the sensor position to fluctuate in a jittering manner. Motion of the sensor causes brightness gradients, from bright/dark boundaries on the surface of the earth, clouds, etc., to move across the sensor pixels, and thus make the image brightness vary in a manner similar to a true target. Consequently, images that are generated by the tracking system contain spurious signal variations, causing an increase in the noise of the system.

One known type of clutter suppression technique which attempts to eliminate the effects of jitter and drift is referred to as subspace projection. Subspace projection is a clutter suppression technique in which most of the noise of the system is mathematically defined within a clutter subspace and the clutter subspace is then separated from the frames of data detected by the sensor. To generate the clutter subspace in subspace projection clutter suppression, a model of the pixel outputs is developed depicting the clutter signal from the sensor, and the clutter subspace which contains this signal is determined so as to mathematically delete it from new images being sensed. Known subspace projection techniques utilize eigenanalysis procedures in order to generate the clutter subspace. One reference that sets out a subspace projection clutter suppression technique of this type can be found in the article J. D. Hulsmann and P. E. Barry, "An Eigenvector Procedure for Eliminating Line-of-sight Jitter Induced Noise from Staring Mosaic Sensors", 19th Annual Asilomar Conference on Circuits, Systems and Computers, Pacific Grove, Calif., Nov. 6–8, 1985.

Although the known subspace projection techniques that use eigenanalysis have been successful in eliminating LOS induced clutter noise, eigenanalysis requires a considerable amount of processing load and memory. Therefore, robust signal processing techniques must be implemented to provide the necessary processing to perform the eigenanalysis that significantly adds to the cost and calculation time of the system. What is needed is a clutter suppression technique which uses a subspace projection clutter suppressor, but which does not require eigenanalysis and has a natural recursive method for controlling responsiveness. It is therefore an object of the present invention to provide such a clutter suppression technique.

SUMMARY OF THE INVENTION

In accordance with the teachings of the present invention, a minimum-spanning gradient filter is disclosed which uses subspace projection clutter suppression, but does not use eigenanalysis. Model frames of data from a focal plane sensor array that do not include targets that are being detected are stored in a first-in first-out buffer memory. At start-up, the model frames of data are applied to a Gram-Schmidt system that generates a series of unit vectors that define a clutter subspace where most of the clutter in the model frames will reside. Current frames of data from the sensor array and the unit vectors from the Gram-Schmidt system are applied to a subspace projection system that removes the clutter subspace from the current frames of data so as to remove the clutter. Once the original clutter subspace has been generated, a recursive plane smoothing system receives the output from the subspace projection system and current frames of data from the sensor array to generate updated clutter subspaces during operation of the filter. The frames of data having the subspace removed are then sent to a target detection system to detect targets of interest.

An averaging system is provided to average pixel intensities in each model frame of data in order to center the pixel intensities in the frames applied to the subspace projection system. A standard deviation for the pixel intensities in each model frame of data is determined and applied to a standard deviation threshold based on expected sensor and electronic noise to prevent the pixels that fall below the threshold from being updated in the clutter subspace in order to decrease processing load. A glint threshold detector can be provided so that if a pixel in the frames of data exceeds a predetermined glint threshold, that pixel also does not contribute to an updated clutter subspace.

Additional objects, advantages, and features of the present invention will become apparent from the following description and appended claims, taken in conjunction with the accompanying drawings.

DETAILED DESCRIPTION OF THE PREFERRED EMBODIMENTS

Figure 1:
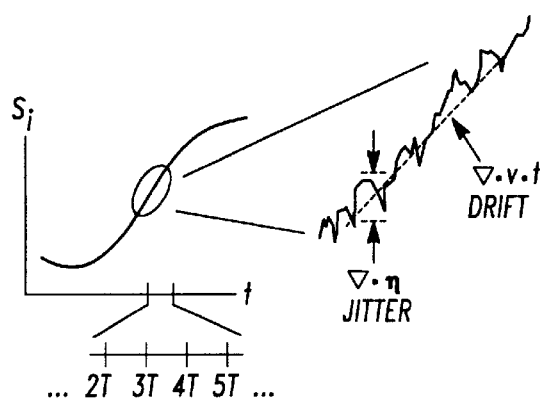
FIG. 1 shows a graphical depiction of a clutter component from a single pixel of a sensor associated with an object detection system.

The following description of the preferred embodiments concerning a subspace projection clutter suppression technique for use in an object detection and tracking system is merely exemplary in nature and is in no way intended to limit the invention or its applications or uses.

DEFINING A CLUTTER MODEL FOR A TARGET DETECTION SYSTEM

Subspace projection clutter suppression requires that a model of the clutter signals in each pixel output be generated. For a small number of sample times, LOS motion in the focal plane of a sensor array (not shown) for those pixels in the sensor array that have a large spatial scene brightness gradient can be described by a first-order Taylor series approximation to the integrated detector output (target-free), incorporating two-dimensional jitter and drift noise components for a pixel i at a sampling time j, by:

$$s_i(t_j) = s_{ij} \approx B_{ij-1} + \nabla_i \cdot D_j + \eta_{ij} = \quad (1)$$

$$B_{ij-1} + \nabla_{xi}(v_x T + \eta_{xj}) + \nabla_{yi}(v_y T + \eta_{yj}) + \eta_{ij}, i = 1: N, j = 1: k,$$

where, $B_{ij-1}$ is the background from $s_{ij-1}$, $B_{ij-1} = B_{ij-2} + \nabla_{xi} v_x T + \nabla_{yi} v_y T, B_{io} = B_i$, $B_i$ is an initial brightness for pixel i, $\nabla_i$ is the spatial brightness gradient vector, $D_j$ is the LOS motion vector due to jitter and drift of the sensor, $\nabla_{xi}, \nabla_{yi}$ are x and y components of $\nabla_i$, $V_x, V_y$ are x and y components of LOS drift velocity, T is the sampling period, $\eta_{xj}, \eta_{yj}$ are x and y components of LOS jitter motion displacement from an initial position of zero, $\eta_{ij}$ represents all other random electronic noise sources, k is a sample time, and N is the number of pixels.

The approximation of equation (1) applies only to measurements of N pixels made simultaneously. If, for example, the wavelength bands are sampled consecutively, equation (1) applies only to pixels in one frequency band. Therefore, the use of equation (1) for all N cluttered pixels represents one integration time "snapshot" of the cluttered image. The N pixels might be a small part of the entire image. This assumes that the motion is translational over the set of pixels being processed. However, the method extends to any linear model of clutter, including a rotational model. By modeling gradients as constant for each pixel during a sample time k, it can be assumed that the pixels will not change radically at the next (k+1) sample time of the same band. Also, while real motion during integration can be complicated, the net effect is represented by the vector $D_j$ in all of the pixels in each cluttered image. It is further assumed that the clutter signal in the pixels is large as compared to $\eta_{ij}$. Although the clutter as a result of the slowly-varying brightness difference between pixels due to drift and the noisy signal due to jitter vibration of the LOS is shown separately in equation (1), the following discussion will use the term clutter for both since the process put forward can suppress each type of clutter using the same mechanism.

FIG. 1 shows the key components of $s_{ij}$ during the sampling period T as modeled by equation (1). The signal $s_i$ is the output of a particular signal from the sensor as shown in the vertical axis and time as shown in the horizontal axis. An enlarged area of the output signal is shown to more clearly depict the clutter components as a result of drift and jitter over three sampling periods. The short term accuracy of a linear model is dependent on many factors such as blur circle size, pixel size, drift rate and scene structure. Generally, for optical resolution matched to detector size, the assumption should get better as the factor of pixel size/drift speed gets larger. Also, brightness gradients, hence jitter noise, are smallest where they change most rapidly, offsetting the effect of LOS and cloud drift on a linear model.

GEOMETRIC INTERPRETATION OF THE CLUTTER MODEL

By ignoring the electronic noise term $\eta_{ij}$ of equation (1) for the moment, the ideal linear (fixed gradient) clutter model may be recognized as a parametric equation in the parameter time, i.e., each pixel output is linear in the two independent parameters $\eta_{xj}$ and $\eta_{yj}$. Simplifying equation (1) to show this fact by letting $\eta_{xj}=x(jT)=x(t)$, $\eta_{yj}=y(t)$, and substituting the previous j−1 B terms provides:

$$s_i(jT) \to s_i(t) = B_i + \nabla_{xi}[v_x t + x(t)] + \nabla_{yi}[v_y t + y(t)] = B_i + \nabla_{xi} p(t) + \nabla_{yi} q(t), \quad (2)$$

where p(t) and q(t) are time parameters.

All of the pixels have the same time parameters p(t) and q(t) for the same sample time k. Therefore, the effect of ideal linear clutter due only to translational motion is to disperse the pixel outputs into a 2-dimensional plane, referred to as the clutter subspace plane (CP), in the dimension N cluttered-image space. This can also be shown by considering the set of computations from equation (2) that results for all of the pixels, then solving for and eliminating the time parameters p(t) and q(t) common to all of the pixels using any two pixel outputs. This result is a set of equations having the form:

$$s_i = as_1 + bs_m + c_i \quad (3)$$

where, a, b and c are constants.

Equation (3) results in a set of equations of the clutter plane CP which do not pass through the origin. If the data is first centered or averaged, the clutter plane CP will pass through the origin, and the constants a and b will determine the orientation of the clutter plane CP as functions of only the fixed brightness gradients of the pixels. This is a two-dimensional plane in dimension N hyperspace, where theoretically the value of any one pixel is algebraically dependent only on any other two pixels. This subspace is spanned by the linear combinations of any pair of non-colinear vectors contained in the subspace. The planar property of clutter can be expressed in a vector form. For example, the clutter vector $\overline{S}_j$ can be depicted as follows:

$$\overline{S}_j = \begin{bmatrix} \overline{s}_{1j} \\ \overline{s}_{2j} \\ \vdots \\ \overline{s}_{Nj} \end{bmatrix} \quad (4)$$

$\overline{S}_j$ is an N×1 vector representing the set of "centered" cluttered pixel values at the sample time k of a clutter image. In this example, centered means subtracting the k time average of each pixel from the individual pixel values. Of course, other types of weighted averages, such as nth-order filtering, could be used. $\overline{S}_j$ is contained in a vector space $\Re^N$. If $\overline{S}=[\overline{S}_1 \overline{S}_2 \ldots \overline{S}_k]$ is an N×k matrix of the last k cluttered images, then:

$$\overline{S} = [\nabla_x \nabla_y][pq]^T = \begin{bmatrix} \nabla_{x1} & \nabla_{y1} \\ \nabla_{x2} & \nabla_{y2} \\ \vdots & \vdots \\ \nabla_{xN} & \nabla_{yN} \end{bmatrix} \begin{bmatrix} p(t_1) & q(t_1) \\ p(t_2) & q(t_2) \\ \vdots & \vdots \\ p(t_k) & q(t_k) \end{bmatrix}^T = \quad (5)$$

$$p(t_1)\begin{bmatrix}\nabla_{x1}\\ \nabla_{x2}\\ \vdots \\ \nabla_{xN}\end{bmatrix} + q(t_1)\begin{bmatrix}\nabla_{y1}\\ \nabla_{y2}\\ \vdots \\ \nabla_{yN}\end{bmatrix} p(t_2)\begin{bmatrix}\nabla_{x1}\\ \nabla_{x2}\\ \vdots \\ \nabla_{xN}\end{bmatrix} + $$

$$q(t_2)\begin{bmatrix}\nabla_{y1}\\ \nabla_{y2}\\ \vdots \\ \nabla_{yN}\end{bmatrix} \ldots p(t_k)\begin{bmatrix}\nabla_{x1}\\ \nabla_{x2}\\ \vdots \\ \nabla_{xN}\end{bmatrix} + q(t_k)\begin{bmatrix}\nabla_{y1}\\ \nabla_{y2}\\ \vdots \\ \nabla_{yN}\end{bmatrix}$$

This set of vectors is formed by multiplying a pair of fixed gradient vectors by k pairs of different motion scalars. All of the resulting target-free cluttered image vectors will lie in the clutter plane CP formed by the two fixed gradient vectors $\nabla_x$ and $\nabla_y$, as will the future or past images. Equation (5) is columnspace oriented, and will be referred to as the pixel or gradient-spanning representation because the pixel outputs are represented by linear combinations of the gradient vectors.

Another interpretation can be put forward. Common motion for all pixels over the sample time k forms a pair of dimension-k fixed motion vectors p and q which can be multiplied by N different gradient scalar pairs to form a cluttered image. This interpretation is row-space oriented, and will be referred to as the time or motion-spanning representation. The matrices generated by equation (5) can be manipulated to emphasize the difference between the two interpretations of the same cluttered images. The second interpretation is given as follows:

$$\underline{S} = [\nabla_x \nabla_y][pq]^T = \begin{bmatrix} \nabla_{x1} & \nabla_{y1} \\ \nabla_{x2} & \nabla_{y2} \\ \vdots & \vdots \\ \nabla_{xN} & \nabla_{yN} \end{bmatrix} \begin{bmatrix} p(t_1)p(t_2)\ldots p(t_k) \\ q(t_1)q(t_2)\ldots q(t_k) \end{bmatrix} = \quad (6)$$

$$\begin{bmatrix} \nabla_{x1}[p(t_1)p(t_2)\ldots p(t_k)] \\ + \\ \nabla_{x1}[q(t_1)q(t_2)\ldots q(t_k)] \\ \nabla_{x1}[p(t_1)p(t_2)\ldots p(t_k)] \\ + \\ \nabla_{x1}[q(t_1)q(t_2)\ldots q(t_k)] \\ \vdots \\ \nabla_{x1}[p(t_1)p(t_2)\ldots p(t_k)] \\ + \\ \nabla_{x1}[q(t_1)q(t_2)\ldots q(t_k)] \end{bmatrix}$$

Of course, jitter effects in a real detector signal will not faithfully obey these mathematical abstractions. The clutter plane CP will not remain two dimensional and will grow into something resembling a wobbling, "fuzzy pancake" having more than two dimensions in pixel space as a result of noise, gradient changes, gradient nonlinearity, LOS and cloud drift, etc. In the case where the detector array is a line or strip, such as in a scanner, jitter might be most predominant in one direction, thus allowing a model which uses only the x or y component of motion. In this case, the ideal clutter plane CP is a one dimensional line in N-space which will expand into a twisting figure representing a "fuzzy hot dog" of more than one dimension. In either of these cases, the clutter energy distribution should tend to be confined to a subspace of small dimension relative to the total number of cluttered pixels over a reasonably short period of time (seconds). This fact allows the subspace to be deleted from the measurement for each clutter image. Since, to a first order, the subspace is planar for a two dimensional focal plane, the term "plane" is used even though the subspace model could be of higher dimensions to capture the real effects.

SUBSPACE PROJECTION

Next, the pixel-spanning representation of equation (5) will be used to explain subspace projection. Subspace projection is an effective approach to clutter suppression in that it attempts to isolate and remove the correlated energy caused by clutter through exploitation of the underlying correlation structure. For example, suppose that k images are used to model the clutter plane CP described above as more formally defined to be the surface of the smallest dimension containing all of the clutter energy. The projection of the next, uncorrected (but centered) N×1 image vector $\overline{S}_{k+1}$ onto the complement of the clutter subspace plane CP within the N-dimension image space is defined to be its corrected value. The corrected image is that part of the next cluttered image which does not fit the current clutter model. Since the clutter subspace plane CP is orthogonal to its complement, this corrected value also happens to be the residual of the least-squares fit of the model to the uncorrected vector. This is shown as follows:

$$\overline{S}_{k+1} = \overline{S}_{k+1} - \overline{S}_{k+1}{}^M \quad (7)$$

where, $\hat{\overline{S}}k+1$ is the corrected image,
$\overline{S}_{k+1}{}^M$ is the model fit to $\overline{S}_{k+1}$,
and $\hat{\overline{S}}_{k+1} \perp \overline{S}_{k+1}{}^M$.

Figure 2:
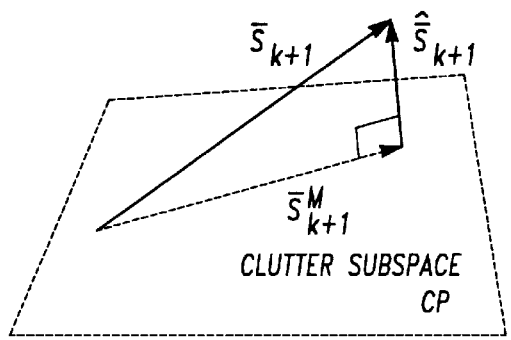
FIG. 2 is a depiction of a clutter subspace of an image vector.

FIG. 2 shows a depiction of the above described relationship. Here the clutter subspace plane CP can be any dimension m subspace of pixel space, subject only to m≤k−1 for the centered data. The clutter subspace plane for the model is referred to as CP(m). Any sample time k can be corrected by this method. For example, $\overline{S}_{k+2}$ or later could be corrected by the same model, as long as the gradients have not changed significantly. As a practical matter, however, sample times used in the model would not be corrected, as it is assumed that model images contain only clutter, and not information such as targets or glint which might bias the estimate of the clutter plane CP. Further if m is close to k−1, model images will be almost completely spanned by the subspace, making it more likely that target energy will not show up as the residual $\overline{S}_{k+1}$.

Since correlated clutter energy should be concentrated into a small subspace, it is natural to consider eigenanalysis as the basis for setting up the model. It is well understood that the eigenvectors $E_i$, i=1:m corresponding to the m largest eigenvalues of a data set's covariance matrix (rank≥m) form unit basis vectors for a dimension m subspace which contains the greatest data variance. Also, this subspace is a least-squares solution or fit to data in the model over all subspaces of this dimension. In other words, the model surface so defined is as close as possible to the data set used to define the surface. From this, an N×k matrix of the last k centered clutter images is given as $\overline{S}$. N is assumed to be greater than k. It is then possible to compute the eigenvectors of $\overline{S}\,\overline{S}^T$ having the N×N spatial sample covariance, without the factor 1/N, corresponding to the m≤(k−1) largest eigenvalues. However, these column-space eigenvectors can be determined more efficiently from an eigenvalue weighted singular value decomposition transformation of the row-space eigenvectors for the k×k sample time covariance $\overline{S}^T\,\overline{S}$. Since these vectors span the entire clutter plane CP(m), the subspace projection equation (7) becomes:

$$\hat{\overline{S}}_{k+1} = \overline{S}_{k+1} - \sum_{i=1}^{m} E_i(E_i^T \overline{S}_{k+1}), m \leq k-1, \quad (8)$$

where $E_i$ is the eigenvector for the ith largest eigenvalue using centered data. In other words, the summation is the clutter plane model least-squares estimates $\overline{S}_{k+1}{}^M$ of the uncorrected pixel vector.

Figure 3A:
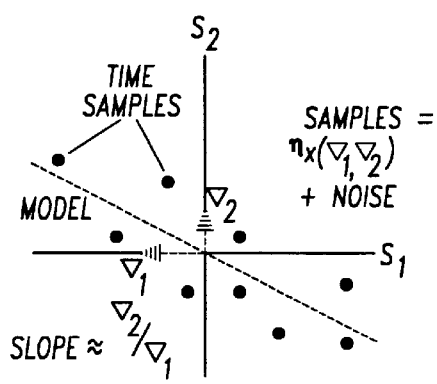
FIG. 3(a)–3(b) shows a graphical depiction of pixel vectors.
Figure 3B:
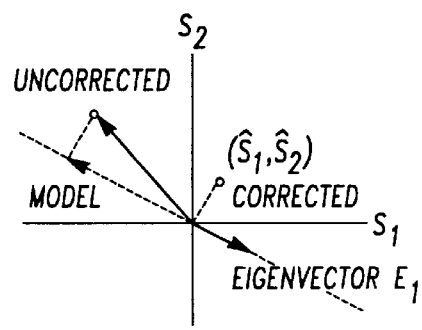

For example, consider a simple case of no drift with jitter in the x dimension only. Such an example leads to a clutter plane CP that is a line. FIGS. 3(a) and 3(b) show a cluster of centered data pairs over k=9 sample times for two pixels, where random noise has been added to an even larger clutter variation. The dotted diagonal line represents the best model fit of a one dimensional subspace to the data. The slope of the line represented is the best fit of the brightness gradient of the second pixel divided by the first pixel. The two components of the gradient vector in equation (5) are shown. If the next, uncorrected pixel vector from the same band falls as shown after centering, the corrected value will be the residual vector perpendicular to the model line, here N=2. Since this residual is really a vector bound to the origin, the corrected value for the two pixels is $(\hat{S}_1, \hat{S}_2)$. In this example, the eigenvector corresponding to the largest eigenvalue of the sample covariance matrix of data pairs is effectively used to span the clutter subspace plane. This eigenvector is colinear with the model line as shown in FIGS. 3(a) and 3(b). Note that one dimension for the model is used that is much smaller than k−1=8. This operation can be shown as follows:

$$\hat{\overline{S}}_{k+1} = \overline{S}_{k+1} - P_m \overline{S}_{k+1} = (I-P_m)\overline{S}_{k+1}, \quad (9)$$

where, $$P_m = \sum_{i=1}^{m} E_i E_i^T = [E_1 E_2 \ldots E_m][E_1 E_2 \ldots E_m \ldots]^T = EE^T.$$

The operator $P_m$ is the unique orthogonal projection matrix for any vector in the dimension N vector space $\mathfrak{R}^N$ onto the clutter plane CP(m). The range of $(I-P_m)$ is the dimension N−m orthogonal complement of CP(m) within $\mathfrak{R}^N$, CP(m)⊥. The uniqueness of $P_m$ establishes that if any N×m set of vectors $[U_i]$=U (i.e., matrix of the $U_i$) form an orthonormal basis for CP(m), then $UU^T=P_m$.

DESCRIPTION OF A MINIMUM-SPANNING GRADIENT FILTER FOR CLUTTER SUPPRESSION

Armed with the above described analysis, the following discussion will be directed to a minimum-spanning gradient filter (MSGF), according to an embodiment of the present invention. There are three key concepts to the proposed MSGF approach. First, if a dimension k−1 clutter subspace model based on k centered clutter image vectors is used, the k vectors automatically determine the subspace. That is, k centered samples define a dimension k−1 surface in N-space, i.e., CP(k−1). Second, any set of orthonormalized vectors which span this subspace can be used to perform subspace projection. In particular, a Gram-Schmidt or equivalent QR procedure using any k−1 size selection of the k image factors can be executed to provide this set. As is understood to those skilled in the art, a Gram-Schmidt process is an effective way of finding unit vectors that are mutually orthogonal. In this type of process, eigenvalues and eigenvectors do not need to be computed, since these eigenvectors must span the identical subspace. Therefore, the same information will be deleted from the uncorrected clutter image vector by these two different sets of spanning vectors. Note, however, that the model dimension m must be equal to the k−1 centered data or k for uncentered data for this equivalence to hold. And third, the angle which this subspace will rotate after inclusion of a new sample in the model can be calculated with a simple technique and smoothed. That is, a filter function can be applied to the rate of model correction as the window of k vectors is shifted in time in order to control and balance responsiveness to noise and gradient changes.

Figure 4A:
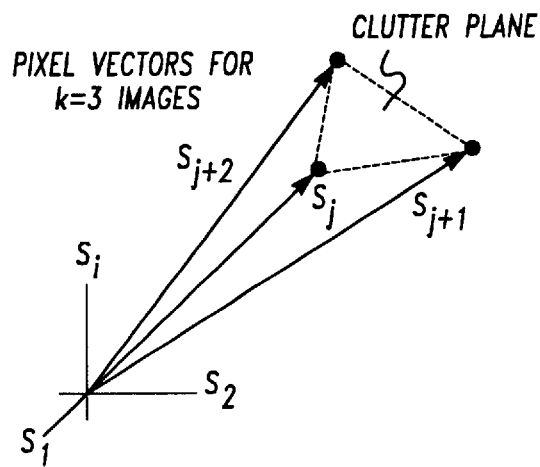
FIG. 4(a)–4(c) shows a graphical depiction of a spanning vector formation according to a preferred embodiment of the present invention.
Figure 4B:
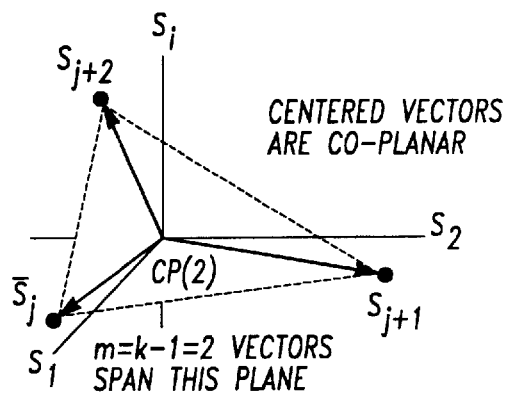
Figure 4C:
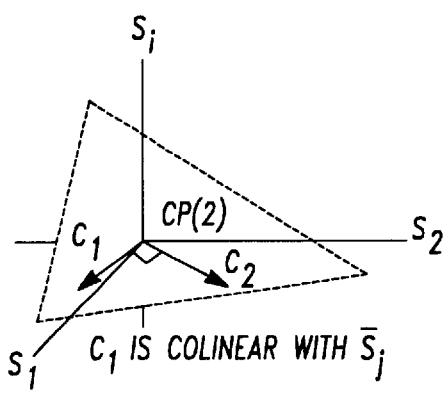

One form of an MSGF according to the invention can be constructed as follows with reference to FIGS. 4(a)–4(c). First, form a unit vector by normalizing any one of the k centered image vectors. Then, a Gram-Schmidt procedure produces the set of unit vectors as follows:

$$C_1 = \frac{\overline{S}_1}{\|\overline{S}_1\|}, \quad C_i = \frac{\overline{S}_i - \sum_{j=1}^{i-1} C_j(C_j^T \overline{S}_i)}{\|\overline{S}_i - \sum_{j=1}^{i-1} C_j(C_j^T \overline{S}_i)\|} \qquad (10)$$

From equation (8), the correction for the next image to remove the clutter subspace from the image is given by:

$$\hat{S}_{k+1} = \overline{S}_{k+1} - \sum_{i=1}^{k-1} C_i(C_i^T \overline{S}_{k+1}) \qquad (11)$$

The speed and processing advantages of the MSGF process comes from avoiding several operations. First, it is not necessary to calculate the covariance eigenvectors. This saves multiplications by avoiding formation of the time covariance matrix and construction of the spatial covariance eigenvectors. A rough estimate of the ratio of multiplications for $N>>k^3$ is about 5 for k=3, and about 4 for k=4, excluding equations (8) and (11). Also, equation (8) requires about twice the number of square roots. As long as care is taken in forming the vectors using the Gram-Schmidt procedure using numerical techniques familiar to those skilled in the art of matrix computations, the spanning vectors in the MSGF should have better precision and orthogonality than those of equation (8) because they do not depend on convergence criteria associated with eigenvalue/eigenvector calculations.

Since the N×(k−1) set [$C_i$] forms an orthonormal basis for CP(k−1), the resulting orthogonal projection operator $P_{k-1}$ is identical to one formed from the N×(k−1) set of eigenvectors [$E_i$]. That is:

$$\underset{k-1}{C} \underset{k-1}{C^T} = P_{k-1} = \underset{k-1}{E} \underset{k-1}{E^T} \qquad (12)$$

Plane Smoothing

The MSGF can be implemented as a moving window of k samples by dropping the first (oldest) sample and adding the k+1 sample to the model. Since this model update preserves the dimension of the clutter plane CP, the effect of the update is to rotate the clutter plane CP within $\Re^N$. This rotation amounts to tilting the plane about the k−2 previous centered images in the direction of the update image. Since noise will tend to "bounce" this subspace around the true value of the gradient slopes, it is possible to add inertia determined by the data. The following tradeoff then occurs. If it is desirable to filter heavy clutter by opening up the subspace to more dimensions, the extra time required to collect more data can reduce the accuracy of the model as the clutter plane CP changes. On the other hand, a clutter model of two dimensions is accurate only for two dimensional LOS motion and linear gradients. The right approach is to balance the subspace size and responsiveness to change.

Figure 5:
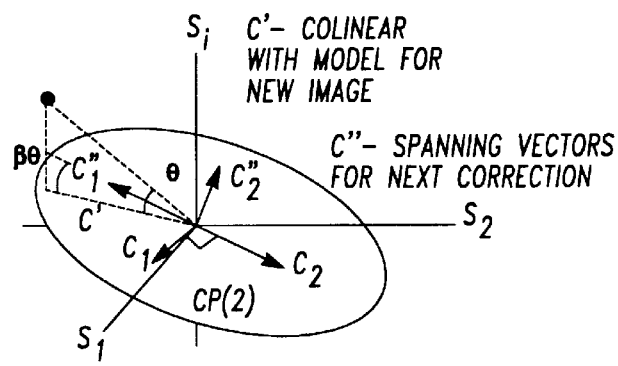
FIG. 5 is an example of a particular clutter plane.

There are many ways to smooth the rotation of the subspace CP(m) during updating. One of those approaches is the "βΘ" approach, which acts like a recursive filter. Rather than use the previous k−1 centered image vectors, the spanning set [$C_i$] will be used as shown in FIG. 5. After the k+1 correction, the Gram-Schmidt procedure is run starting with the model fit $C' = \overline{S}_{k+1}^M$ to the uncorrected image. Any k−2 spanning vectors can be used to complete the procedure. This rotates the spanning vectors CP(m) until one vector is colinear with the model fit. In the CP(2) example shown in FIG. 5, the result is C' and $C_2$". Now the angle between C' and the update vector is computed and C' is rotated by a fraction β of the angle Θ between CP(2) and the update vector $\overline{S}_{k+1}$. Since $C_2$" is orthogonal to both C' and the direction of rotation, this rotation does not affect it. In fact, no matter what the size of m is, only the vector C' needs to be rotated towards the update since all the other C" are orthogonal to both C' and the subspace into which C' is being rotated. All of these operations are straightforward, as model fit is a byproduct of each correction, and the implied arctangent calculation can use coarse numerical approximations. The effect of this procedure is the same as smoothing a random vector normal to CP(k−1) in k space.

Figure 6:
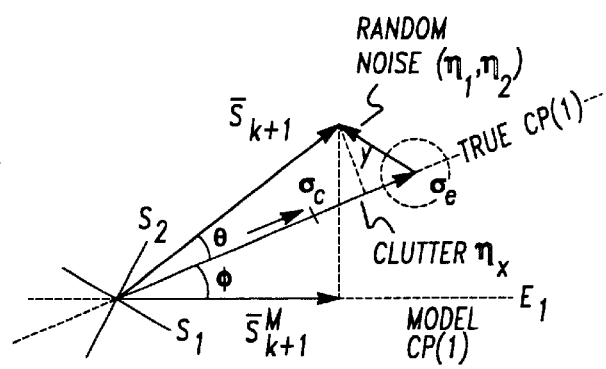
FIG. 6 is a noise model depiction.

The distribution of the angle from the clutter plane CP to the new image $\overline{S}_{k+1}$ provides some additional insight into good smoothing functions. For convenience, an example will be developed using motion in one direction only giving a line CP(1) as the model, 2 pixels, and independent zero mean normal distributions N(0,σ²) for all jitter and noise components. FIG. 6 shows this model and its update with jitter excursion about 1.5 times its standard deviation and random noise excursion about twice its standard deviation. The probability density function of the angle Θ can be derived by calculating the angle distribution of jitter and noise along the true model line, then adding φ as a constant, as follows. Since the random/electronic noise component is assumed to have the same variance in both dimensions, its projection onto the true clutter plane CP has the same standard deviation as its projection onto CP(1). Therefore, the problem of finding the distribution of Θ can be worked with respect to a coordinate system aligned to the true clutter plane CP by adding the random noise component "x" (not shown) along the clutter plane CP to the jitter component, then taking the random noise component "y" normal to CP as the height of the desired right triangle for $\Theta$. Therefore, $\Theta$ is given as follows:

$$\theta = \arctan \frac{y}{x} + z, \begin{cases} y \sim N(0, \sigma_e^2) \\ x \sim N(0, \sigma_e^2) \\ z \sim N(0, \sigma_c^2) \end{cases} \quad (13)$$

where $\sigma_e^2$ and $\sigma_c^2$ are noise and jitter variances.

The distribution of $\overline{S}_{k+1}$ can be shown to be bivariate normal with diagonalized covariance having entries $\sigma_c^2 + \sigma_e^2$, and $\sigma_e^2$, and a semi-major axis colinear with the true clutter plane CP. The distribution of $\Theta$ can be found by modifying a derivation of the Cauchy distribution, well known to those skilled in the art. This distribution is defined as:

$$f_\theta(\theta) = \frac{\sqrt{1+\alpha^2}}{2\pi(1+\alpha^2\sin^2\theta)}, \begin{cases} \alpha = \sigma_c/\sigma_e \\ -\pi < \theta < \pi. \end{cases} \quad (14)$$

Figure 7:
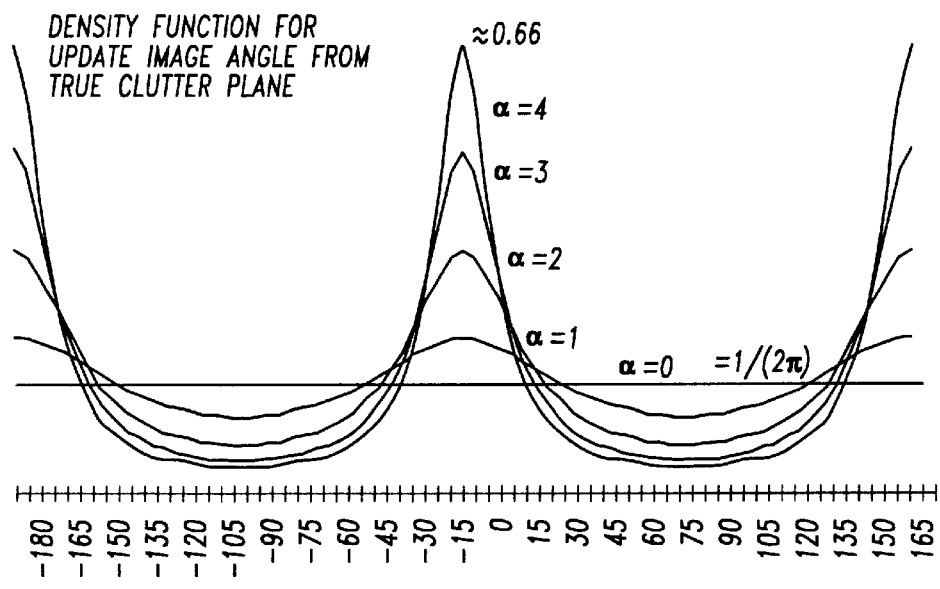
FIG. 7 is a graphical depiction of a density function.

FIG. 7 shows a graph of the $f_\theta(\theta)$ density function. The distribution of $\Theta$ is conditioned on the value of the jitter component and provides some feel for the influence on $\Theta$ of the amount of the jitter signal. Here, $\Theta$ is defined by equation (13) with z replaced by a constant representing the given jitter amplitude as follows:

$$\theta = \arctan \frac{y}{x+A}, \begin{cases} y \sim N(0, \sigma_e^2) \\ y \sim N(0, \sigma_e^2). \\ A = \alpha\sigma_e \end{cases} \quad (15)$$

Figure 8:
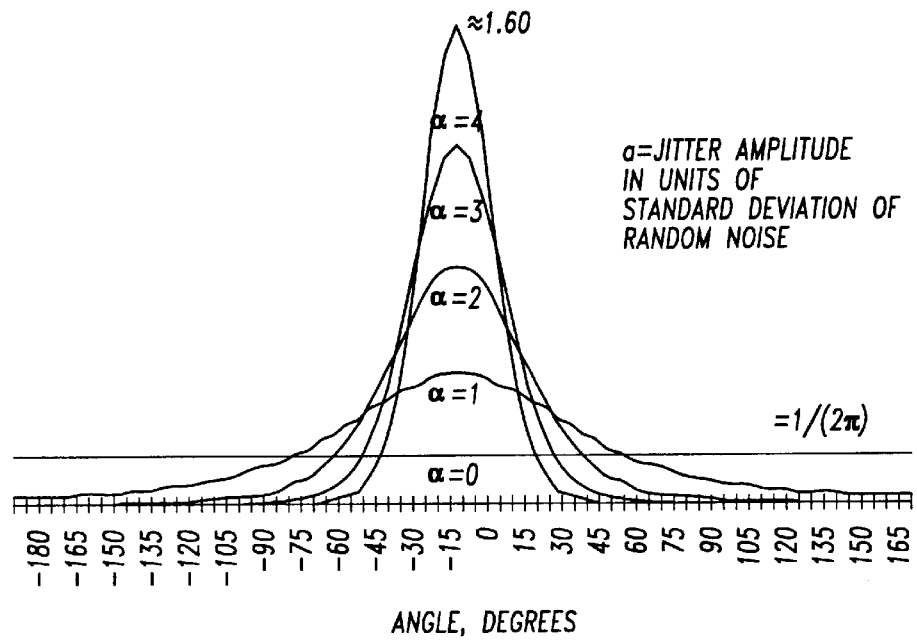
FIG. 8 is a graphical depiction of the jitter component of a density function.

Equation (15) may be recognized as the phase part of a Rician distribution, known to those skilled in the art. The phase part is less well known than the amplitude part that is used extensively in the theory of both envelope detection and fading communication channels. The distribution of the length of the observation will be that of the Rician amplitude. The phase calculation is only extended to $2\pi$ as:

$$f_\theta(\theta|\alpha) = \frac{e^{-\frac{\alpha^2}{2}}}{2\pi} +$$

$$erf\left(\frac{\alpha\cos\theta}{\sqrt{2}}\right)\left[1 + erf\left(\frac{\alpha\cos\theta}{\sqrt{2}}\right)\right]e^{\frac{-\alpha^2\sin^2\theta}{2}}, \begin{cases} \alpha = \text{jitter}A/\sigma_\Theta \\ -\pi < \Theta < \pi \end{cases} \quad (16)$$

where erf is a mathematical error function. FIG. 8 shows a graph of the density function $f(\theta)$ for equation (16).

Figure 9:
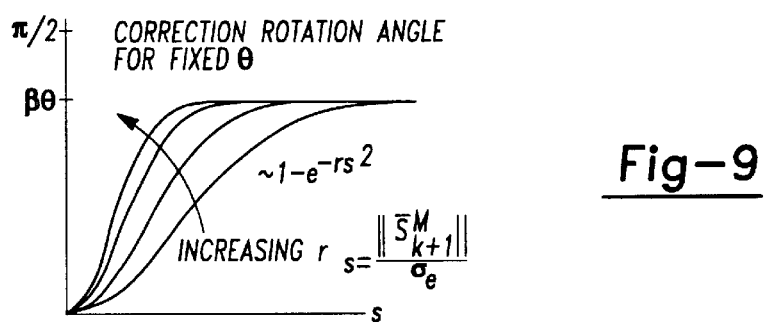
FIG. 9 is a graphical depiction of a weighting function.

The shapes of the conditional and unconditional densities are similar in the vicinity of zero degrees. These densities emphasize that the greatest improvement using subspace projection occurs when jitter is large relative to other noise sources. A useful result would be the density function $f_\theta(\theta+\phi|\overline{S}_{k+1}^M)$. However, this presumes some distribution for $\phi$. Since this angle depends on both the algorithm and the brightness gradient changes, it seems practical to assume that the true clutter plane CP is close to the model, and influence the update according to the approximation $A \approx \| \overline{S}_{k+1}^M \|$. This suggests a class of heuristic "influence" functions with the shape as shown in FIG. 9. In this example, a full correction up to the recursion factor $\beta$ is used when the measured length of the modeled image is large relative to the estimated standard deviation of random noise. An exponential form of weighting seems natural due to the noise distribution. Therefore, experimenting with $\beta$ and r to find an operating point would be required. Note that noise excursions larger than $\pi/2$ will not be detected, and hence not corrected, since the measured angle is taken to be the smallest clutter plane CP. Another approach might be to let $\beta$ be a simple function of $\|\overline{S}_{k+1}^M\|/\sigma_e$.

Intuitively, the net effect of a good smoothing or influence function should be to substitute the inertia inherent in a sample covariance approach which spans a predetermined number of sample times k, without doing the work associated with a covariance and eigenvector calculation. The idea of functions of those shown in FIG. 9 is a weighting according to the aposteriori probability that the corrected update image belongs to the clutter model rather than to random noise. In any case, the main point is to control the clutter filter by controlling or filtering the model update, much like the model update in a Kalman filter, well known to those skilled in the art, allowing gradient changes to be incorporated while damping the reaction to random noise.

Centering the Data

Figure 10:
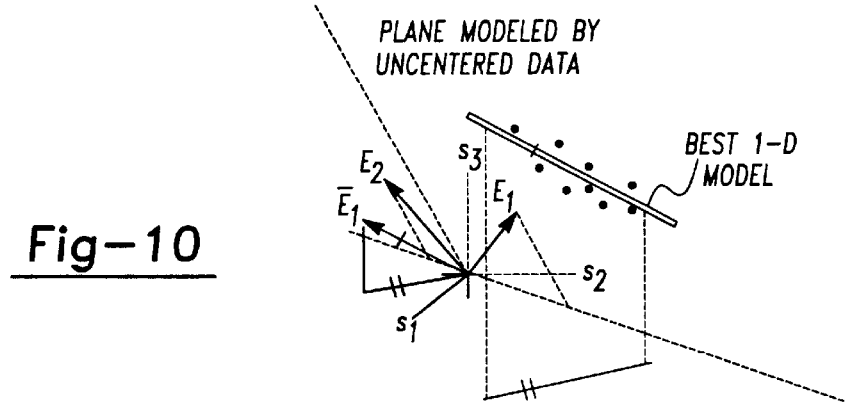
FIG. 10 is a graphical depiction of a centered model.

It is also important to center the pixel intensity data. The spanning vectors formed from centered data are more efficient in describing the clutter model. FIG. 10 shows a case of modeling using uncentered (m=k=2) and centered data (m=k-1=1). When the data is uncentered, the first eigenvector $E_1$ is used to describe the direction of the centroid of the data cluster, which generally has no relationship to the direction of clutter dispersion. The second eigenvector $E_2$ must be normal to the first. Therefore, it generally will also not be oriented along the line of dispersion either. The most that can be said about $E_1$ and $E_2$ is that the plane they define contains the efficient model. The same will be true for the subspace of an MSGF approach using uncentered data. In FIG. 10, the best clutter model is one dimensional.

For centered data, the spanning vector $\overline{E}_1$ will point along the direction of the model data dispersion. Since some kind of average or background estimate is maintained for threshold determination anyway, centering should add less of a processing load than the inner products save by eliminating one vector calculation.

The importance of a centered model is that it helps to make the clutter subspace as small as possible by eliminating one dimension. For example, looking at FIG. 10, a wild data point which landed a large perpendicular distance away from the correct 1-dimensional model, but close to the plane modeled by uncentered data, would be corrected to a small value. In other words, an uncentered model has one extra, unnecessary dimension which may reduce potential target activity. Of course, the key to good centering is good background estimation.

Target Eneray Loss

One disadvantage in using subspace projection to reduce clutter is that some target energy (or any energy which is projected onto the model) will be lost in the model, and some will be "leaked" from the target pixel into other pixels. Having a large number of pixels in the model suppresses the latter effect. Since the leakage would generally be small, it seems unlikely that it would cause a false alarm problem in another pixel which is cluttered. Large false targets such as glint can be detected and separated as shown below.

Figure 11:
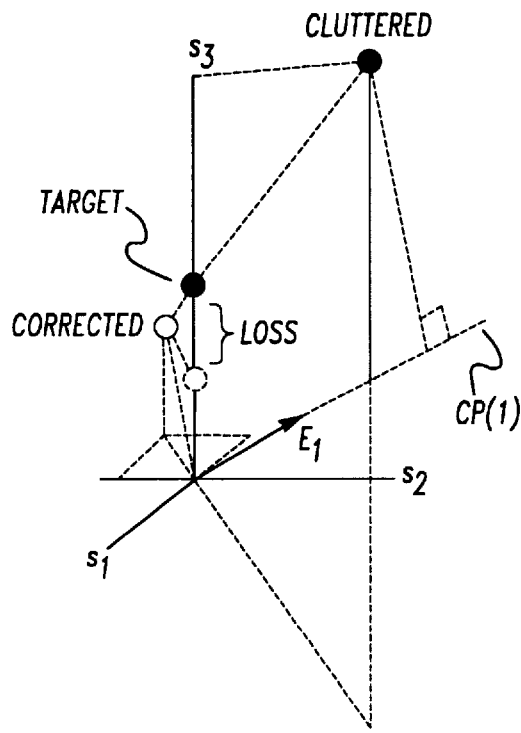
FIG. 11 is a target energy lost model.

The target loss effect can be illustrated by considering an example for CP(1), shown in FIG. 11, where the clutter model is pointed at $(1,1, \ldots, 1)^T$ in N-space. That is, the pixels all have the same gradients. FIG. 11 shows the effect of pixel correction on other pixels in the model for N=3 and a target in pixel $S_3$. Most of the target energy in pixel $S_3$ will be retained by $S_3$ because its axis is the only one which is coplanar with the model line and the cluttered sample. In the case of N pixels, a geometric construction shows that if a target value of T is added to pixel i under these conditions with no electronic noise, the output of the filter can be given by:

$$s_i = \frac{T}{2}, \quad s_j = \frac{T}{2\sqrt{N-1}}, \quad j \neq i. \tag{17}$$

These terms might be considered figures of merit for general performance. Target loss or leakage for an individual pixel i can be computed by applying P to the unit vector $[0,0,\ldots,0,1,0,\ldots,0]^T$, where 1 is the ith component and examining the result. This is equivalent to applying the ith column of I−P, which can be computed from the inner products of $CC^T$ or $EE^T$ without computing P explicitly.

Target Threshold

Since the orthogonal projection P is a linear operator, the corrected image spatial covariance can be given by:

$$K_{I-P} = \text{cov}([I-P]S) = [I-P]\text{cov}(S)[I-P]^T = [I-P]K[I-P] = K - PK - KP + PKP. \tag{18}$$

If the x and y components of jitter and electronic noise are independent, and drift is ignored, $K_{I-P}$ can be approximated as follows. First, assume that m=k−1=2. Then, let E be an N×N matrix representing the orthonormal completion of the CP(m) spanning eigenvectors E for the spatial covariance $\overline{S}\,\overline{S}^T$. To the extent that this sample covariance represents the true covariance, the distribution of the correct pixels can be estimated. Supposed there is no error in E as an estimate of the eigenvectors of K. E can be partitioned into the CP(2) spanning eigenvectors and their complement as $$E = \begin{bmatrix} E & E \\ m & n-m \end{bmatrix}.$$

Therefore, equation (18) becomes:

$$K_{I-P} = EE^T K_{I-P} EE^T = EE^T(K - PK - KP + PKP)EE^T \text{ (as } EE^T = I\text{)} \tag{19}$$

For ideal clutter with no drift, E diagonalizes K into:

$$E^T KE = \Sigma = \text{diag}(a\sigma_c^2 + \sigma_e^2, a\sigma_c^2 + \sigma_e^2, \sigma_e^2, \sigma_e^2, \ldots, \sigma_e^2) = \text{diag}(\sigma_1^2, \sigma_2^2, \ldots, \sigma_N^2) \tag{20}$$

where, a is a linear function of the square of each of 2N pixel gradients as seen from equation (1);

$\sigma_c^2$ is jitter variance (assumed to be the same in x and y); and $\sigma_e^2$ is the variance of electronic noise (variance of $\eta_{ij}$ in equation (1)).

The exact form of the first m terms of the diagonal covariance are not as important in this derivation as the effect of the projection. Then using the definition of P and this diagonalization, equation (19) can be manipulated into the desired form as:

$$K_{I-P} = E(E^T KE - E^T PKE - E^T KPE + E^T PKPE)E^T \tag{21}$$

$$P = P_m = \frac{E\,E^T}{m\,m},$$

$$K = E\Sigma E^T =$$

$$E\left[\Sigma - E^T\left(\frac{EE^T}{mm}\right)(E\Sigma E^T)E - E^T(E\Sigma E^T)\left(\frac{EE^T}{mm}\right)E + E^T\left(\frac{EE^T}{mm}\right)(E\Sigma E^T)\left(\frac{EE^T}{mm}\right)E\right]E^T = E(\Sigma - I_m I_m^T \Sigma I - I\Sigma I_m I_m^T + I_m I_m^T \Sigma I_m I_m^T)E^T$$

$$E^T \frac{E}{m} = I_m = \begin{pmatrix} I \\ 0 \end{pmatrix}_{(N-m)xm}^{mxm}, \quad I_m I_m^T = \begin{pmatrix} I & 0 \\ 0 & 0 \end{pmatrix} = E(\Sigma - \Sigma_m - \Sigma_m + \Sigma_m)E^T$$

$$\Sigma_m = \text{diag}(\sigma_1^2, \sigma_2^2, \ldots, \sigma_m^2, 0, \ldots, 0) =$$

$$E(\Sigma - \Sigma_m)E^T = E \cdot \text{diag}(0, \ldots, 0, \sigma_e^2, \ldots, \sigma_e^2)E^T$$

where the last expression has m zeros.

Because the spanning set C forms an identical $P_m$, the corrected data covariance using C is the same. For the case of general m, the noise distribution in the subspace may not be of equal variance as it is in the example above. Nevertheless, the orthogonal projection still deletes whatever energy is projected onto the clutter plane model CP(m) from N-space and spreads the remainder back into N-space. Since N is much larger than m, the power of uncorrelated electronic noise in each pixel should not be significantly affected by this operation. Equation (21) also implies that an estimate of the electronic noise variance and target loss as described above can be used to set a target detection threshold in corrected pixels.

Drift

Drift in the linear model introduces a "stretching" of the clutter dispersion on the clutter plane CP which should cause a problem similar to that of an uncentered data if gradient changes are significant. As the brightness gradients and background change, an efficient model of clutter should rotate in N-space along with the slope of the gradient ratios. Uncompensated drift adds a growing term at each sample time which is usually not averaged out by time averaging the model data. Therefore drift compensation will help clutter suppression and vice verse. As the ratio of pixel size/drift speed gets smaller for optical resolution matched to pixel size, target strength may become large enough to overcome random jitter and electronic noise, but the increased rate of background variation will complicate setting a threshold. One approach is to increase the size of the subspace by including more samples in the model at the expense of deleting non-cluttered data. Another is to use the nth-order difference filtering to estimate the background at the expense of added noise.

If scene rotation and/or blooming is a problem, the focal plane processing could be subdivided by operating on contiguous data with concentric, segmented bands so that non-translation motion over the focal plane is almost linear within each segment.

Figure 12:
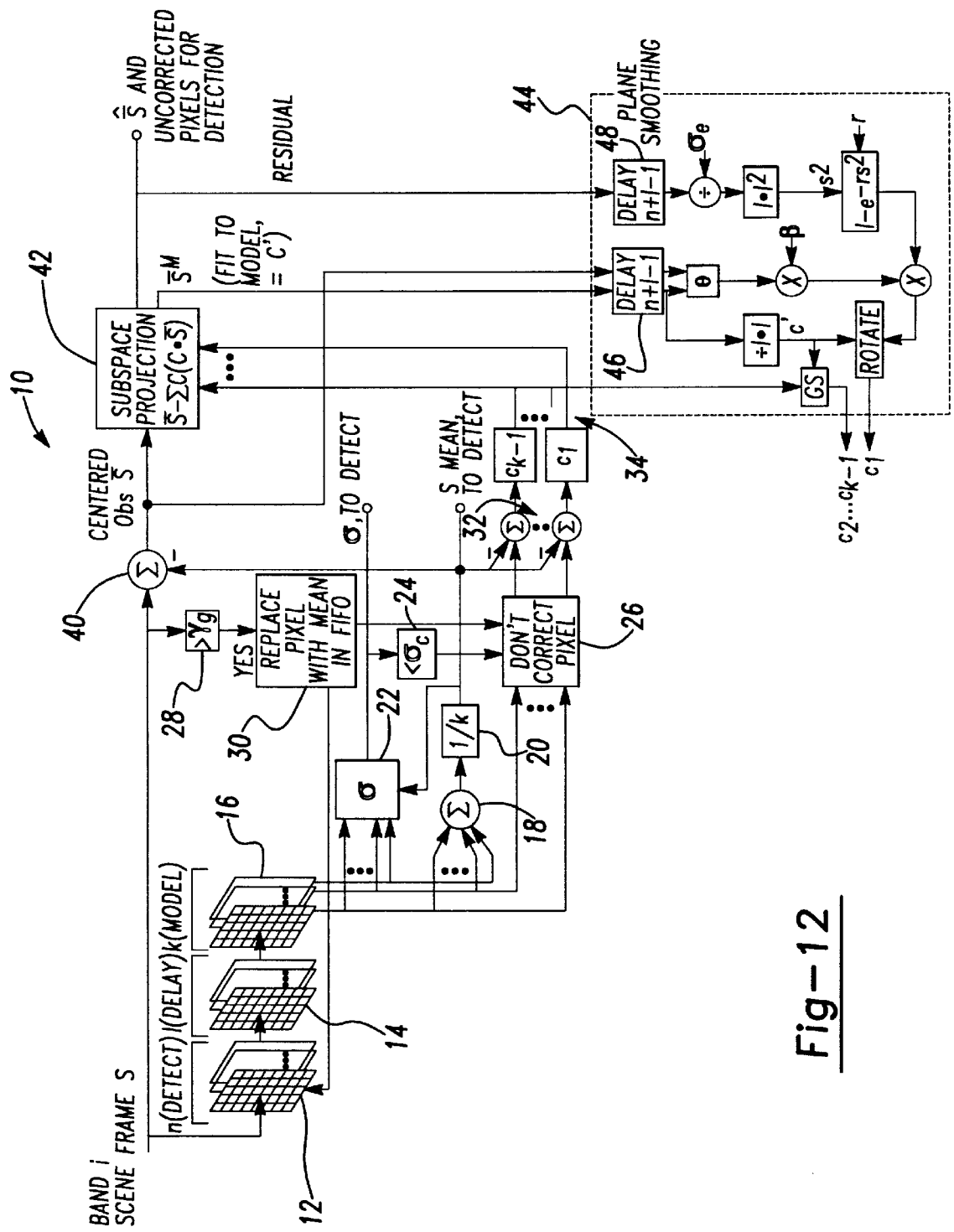
FIG. 12 is a schematic block diagram depicting a minimum spanning gradient filter used for scene clutter suppression according to an embodiment of the present invention.

FIG. 12 shows a schematic block diagram of one implementation of a minimum-spanning gradient filter 10 for suppressing clutter according to an embodiment of the present invention. The filter 10 receives images as pixel intensity data from a sensor array (not shown) sensing a scene, such as an infrared focal plane sensor array, associated with a target detection and tracking system (not shown) over a particular frequency band i. The operation of the filter 10 would be carried out prior to the images from the sensor array being tested for the presence of a target. A separate gradient filter would be provided for each band i of the tracking system. For example, in the targeting system disclosed in U.S. Pat. No. 5,300,780 there are seven separate frequency bands each requiring its own filter. The corresponding notation of the filter 10 follows the analysis of a minimum-spanning gradient filter according to the invention as discussed above. Consequently, the discussion below of the filter 10 can be found detailed above.

Focal plane scene data from the sensor array enter the filter 10 from the upper left as scene frames S over the particular frequency band i. A first-in first-out (FIFO) buffer memory 12 stores a number of current successive frames or images of the scene being sensed for objects of interest at one frame per sample time. Each frame or image is represented by a plurality of pixels, represented here as individual squares in the memory 12. In one known targeting system there are 256×256 pixels per frame. A FIFO buffer memory 14 provides a delay of l number of frames over which successive frames can be stored for reasons that will become apparent from the discussion below. Additionally, a FIFO buffer memory 16 stores successive frames of the scene as model frames of data that will be used to determine clutter subspaces. In this example, the k oldest frames in the buffer memory 16 form the model frames, and the n newest or current frames in the buffer memory 12 are tested for the presence of a target by a target detection process (not shown) to determine whether a target is present in the model frames that would not be clutter. In one example, there are about fifteen frames that form the model frames in the memory 16 and five frames that are tested for the presence of a target in the memory 12. Any applicable target detection process known in the art can be used to determine whether a target is present in the frames of data stored in the buffer memory 12. The target detection process would be performed after the filter 10 removed the clutter from the frame of data in the manner that is being discussed. The time separation of the n detect frames stored in the buffer memory 12 that are detected for the presence of a target and the k model frames stored in the buffer memory 16 allow the system 10 to determine that there are no targets in the model frames that would show up as clutter and corrupt the clutter model with target data.

Figure 13:
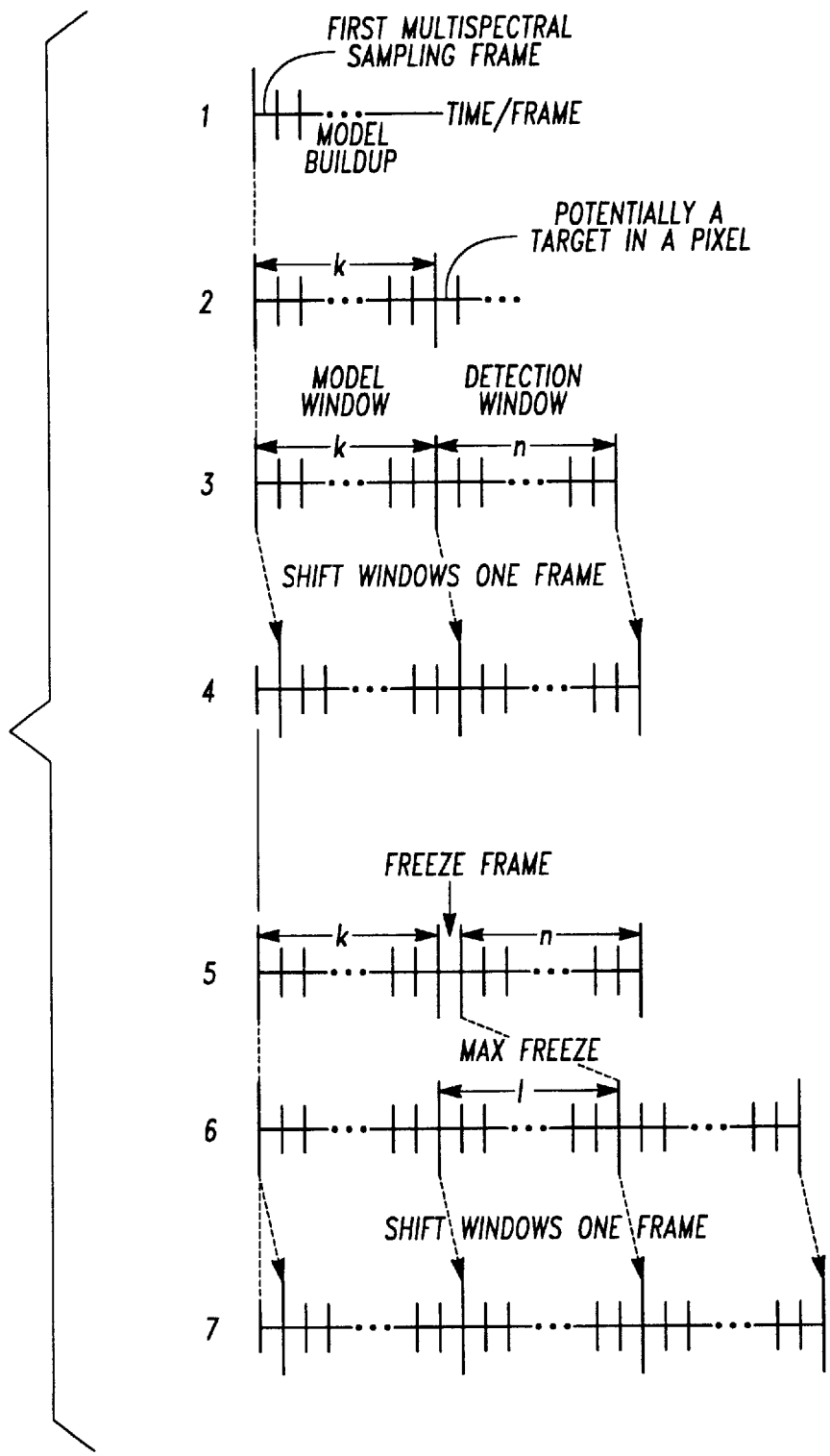
FIG. 13 is a series of time line diagrams depicting the separation of model window frames and detection window frames for the minimum spanning gradient filter of FIG. 12.

FIG. 13 shows a series of time lines that depict how the filter 10 represented in FIG. 12 defines a series of model frames stored in the memory 16 and a series of detect frames stored in the memory 12. Time is represented along the horizontal axis of each time line and a series of hash lines on the horizontal axis separate consecutive frames of data. As shown by a first time line, a clutter model window is being generated as a series of frames produced at each sample time. A second time line shows a model window being k frames of data that are stored in the memory 16 and represent the model frames to be used to determine the clutter subspace model. Subsequent frames of data will then be stored in the memory 12 as a detection window representing the n detect frames. Once the n detect frames are generated as a detection window, the process for determining if a target is present can be performed on these frames of data as corrected by the filter 10.

In one example, a test for determining whether a target is present in each pixel is referred to an m-out-of-n rule test where a predetermined number of frames m in the n frame detection window must show a target for that pixel in order for the system to determine that a target exists. For example, if there are five frames of data in the detection window, then three coincident pixels in those frames must show the target is present. If less than m number of frames of data show a target, the system 10 determines that a target is not present, and the model window and the detection window are updated by moving the most recent frame of data into the detection window, moving the oldest frame of data from the detection window into the model window, and discarding the oldest frame of data in the model window as shown in the fourth time line.

If, however, a target is detected in the detection window, the memory 14 is incorporated to store successive frames from the detect window so as to keep the model window constant while the target is present. This is shown in the fifth time line where one frame of data is shown as a freeze frame as a first frame of data stored in the memory 14. If the target detection process continues to detect a target in the updated detection window, more freeze frames will be added to the delay memory 14 as shown by the sixth time line. As the freeze frames increase in number, the model window remains constant. Each time a new frame is introduced into the detection window, the test for a target is repeated. At some point, a maximum number of delay freeze frames in the memory 16 will be achieved, where a target is still detected in the detection window, but the model must be updated. The maximum freeze frame window is l frames shown in the sixth time line. At this time, the process is shifted one frame such that the model window is updated, but may include a target pixel as shown in the seventh time line.

Returning to FIG. 12, each pixel for the band i is passed through a series of operations on a frame-by-frame basis to generate a clutter subspace. Particularly, each pixel from the buffer memory 16 is applied to a summation junction 18 to add the pixel intensities in each frame of data for averaging purposes. The summation in the summation junction 18 of all of the pixels for each frame from the buffer memory 16 is applied to a 1/k averaging system 20 to generate the average intensity for that set of pixels for centering purposes as will be discussed below. Averaged pixel intensities $S_{mean}$ for each frame S from the averaging system 20 are then applied to subsequent detection operations (not shown) for target detection that will be understood to one skilled in the art.

Each pixel of the model frames in the buffer memory 16 are also applied to a standard deviation calculation system 22. The standard deviation calculation system 22 also receives the average pixel intensity $S_{mean}$ from the averaging system 20. A clutter sniffer 24 takes a standard deviation a of each pixel in the model frames in the buffer memory 16 over the modeling period. The average pixel intensity $S_{mean}$ and the standard deviation $\sigma$ of the pixels are determined over the modeling period using conventional statistical formulae or adaptive techniques, such as Kalman filtering, based on a model of the scene statistics. These quantities are also useful for threshold settings and subsequent detection operations (not shown) as would be understood to someone skilled in the art. If the standard deviation $\sigma$ of a pixel is below a predetermined threshold $\sigma_c$, as determined by the clutter sniffer 24, based on expected sensor and electronic noise, this pixel is not corrected as determined by a do not correct pixel system 26. The clutter sniffer 24 is provided to prevent electronic and detector noise from altering the clutter subspace model of the LOS jitter noise.

The frames of data S are also applied to a glint threshold detector 28. The glint detector 28 determines if the absolute intensity of each pixel in the frames S are above some glint threshold value $\gamma_g$ that may undesirably alter the subspace model. If the intensity value applied to the detector 28 is above the glint threshold $\gamma_g$, this pixel is ignored in the process so as to avoid large leakage into adjacent pixels as a result of subspace deletion as described above. If a pixel intensity exceeds the threshold value $\gamma_g$, then that pixel is applied to a system 30 so as to replace the pixel having an intensity above the glint threshold value $\gamma_g$ with an average intensity pixel and keep that excessively intense pixel from updating the subspace model. An output of the system 30 is applied to the system 26 so the system 10 does not correct a pixel above the glint threshold $\gamma_g$.

The frames S are applied to a summation junction 40 to be summed with a negative of the average pixel intensity $S_{mean}$ from the averaging system 20 so as to center the frames of data S. Centering the pixel intensity data concentrates the variation of the data into as smallest subspace as possible. Although the step of centering is not necessary to perform the filtering of the invention, such a centering step has known advantages. A more detailed discussion of centering of the pixel data can be found above with respect to FIG. 10 and the corresponding discussion. Centered frame data $\overline{S}$ from the summation junction 40 is then applied to a subspace projection system 42. The subspace projection system 42 performs the subspace projection technique on the centered frame data $\overline{S}$ as discussed above with respect to equation (11) so as to remove the clutter subspace in the frames and output frame data $\overline{S}$ having substantially all of the clutter removed.

The first set of subspace basis vectors that form the clutter subspace model that most of the LOS jitter noise resides are determined using a Gram-Schmidt procedure as discussed above with reference to FIGS. 4(a)–4(c), equation (10) and the corresponding discussion. A negative of the average pixel intensities $S_{mean}$ from the averaging system 20 is applied to a series of summation junctions 32 to be summed with a signal from the system 26 so as to remove the pixels that are not to be corrected as discussed above. A summation junction 32 is provided for each k frames of data in the memory 16. Outputs of the summation junctions 32 are applied to a series of Gram-Schmidt systems 34 that will perform Gram-Schmidt calculations on the pixels to be corrected for clutter in the model frames. The Gram-Schmidt system 34 generate a series of unit vectors that define the clutter subspace model by equation (10). The unit vectors are defined as $C_1$–$C_{k-1}$ to include all of the model frames in the memory 16. The outputs from the Gram-Schmidt detector system 32 are applied to the subspace projection system 42 at initial start-up.

After the initial clutter subspace model has been generated by the Gram-Schmidt calculations, a plane smoothing operation as depicted by a plane smoothing system 44 is used to update pixel corrections in subsequent clutter subspace models. Plane smoothing is discussed above with reference to FIGS. 5–9. As discussed above, the plane smoothing process attempts to reduce the rotation of the clutter subspace due to random noise during the clutter subspace updating process as new frames are added to the memory 16 so as to maintain the clutter subspace model substantially close to the true clutter subspace. The plane smoothing system 44 uses a βθ approach acting as a recursive filter. In the plane smoothing operation, the centered frame data $\overline{S}$ and the C' model fit from the subspace projection system 42 are applied to a first delay n+l–1 system 46 and a residual corrected frame data $\overline{S}$ is applied to a second delay n+l–1 system 48 as shown. The delay n+l–1 systems 46 and 48 synchronize the clutter subspace updating with an output from the part of the image frame which fits the subspace model, i.e., lease squares or projection fit, and a residual in the current frame.

Other operations within the plane smoothing system 44 can be found detailed above. The delayed fit from the delay systems 46 and 48 is compared to the corresponding uncorrected, but centered frame data (which corresponds to the next uncentered frame to be sent to the model window in the buffer memory 16) to determined the angle θ between them. A unit vector C' is computed from the fit, while a result of two factors, a user-adjusted recursion factor β and an amplitude factor $1-e^{-rs^2}$, are applied to the angle to rotate the unit vector in the direction of the next frame. $1-e^{-rs^2}$ is calculated from the magnitude of the residual of the frame vector fit, or alternately the length of the total centered frame vector $\overline{S}$ relative to expected noise, $\sigma_e$ and adjusted for effect by a user selectable gain factor r. A Gram-Schmidt (GS) system performs a Gram-Schmidt procedure on the remaining basis vectors to rotate these vectors within the previous clutter subspace to produce new subspace vectors $c_2$ to $C_{k-1}$.

The Gram-Schmidt start-up process can be replaced with other techniques for basis vector formation such as eigenanalysis. The subspace vectors $C_1$ and $C_2$ . . . $C_{k-1}$ that are output from the plane smoothing system 44 are applied to the subspace projection system 42 to update the clutter subspace for each new frame entering the memory 16 after the subspace vectors from the Gram-Schmidt systems 34 generate the original set of subspace vectors at start-up. The plane smoothing update process could also be replaced by a Gram-Schmidt procedure, in which case the plane smoothing system 44 would be removed and the start-up Gram-Schmidt systems 34 would be repeated for all frames.

Comparison of the MSGF with Other Subspace Projection Techniques

Figure 14:
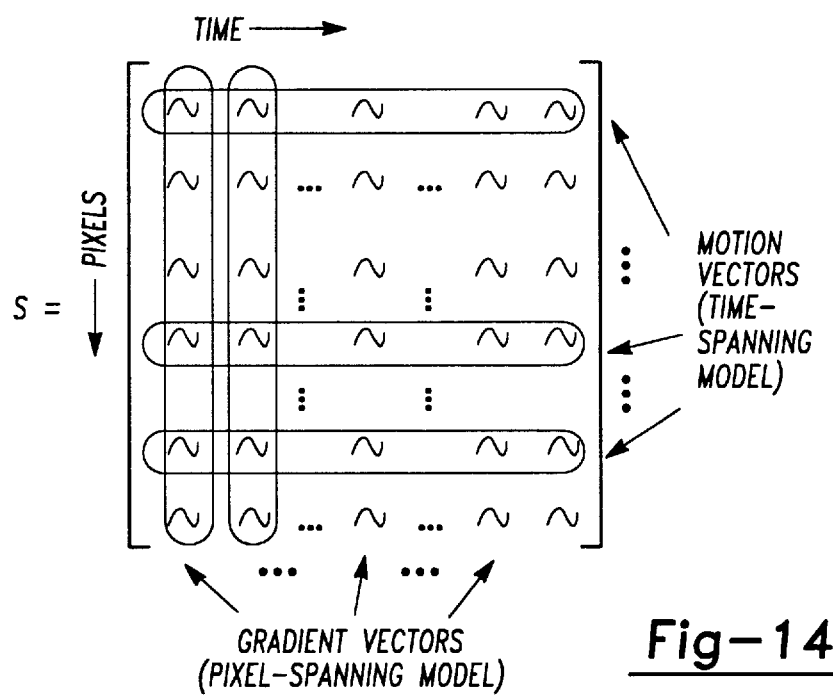
FIG. 14 is a model of pixel and time-spanning.

The pixel spanning implementation of subspace projection in the MSGF used fixed gradients to construct subspace spanning vectors in N-pixel space as shown in equation (5). As long as these gradients do not change significantly, the filter can correct future cluttered images of the same pixels in the model. Another classic projection approach follows equations (6) by spanning the clutter plane using motion vectors. In this technique, cluttered images from different pixels, that are not part of the model and are from the same focal plane, but which are sampled at the same time as the model can be corrected. Equation (6) is used to construct a model of the clutter plane formed by the vectors p and q. Here the projection operator for the clutter plane CP is formed from the first m eigenvectors of $\overline{S}^T \overline{S}$. One general comparison of time/motion-spanning subspace projection with pixel/gradient spanning subspace projection is that if one can perform operations row-wise with time spanning, one can perform operations column-wise with pixel spanning. FIG. 14 shows a comparison of the relationship between model and correction process over the image matrices $\overline{S}$ for time spanning and pixel spanning. Note that the use of eigenanalysis on all of the data links both approaches together through the singular values of $\overline{S}$. With these singular values, the SVD can be used to compute either column-space eigenvectors or row-space eigenvectors, as was pointed out above. In principle it should be possible to switch back and forth in a sort of hybrid approach. This is not true of the MSGF, as singular values are not available.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A clutter suppression system for suppressing clutter in an object detection system, said object detection system sensing a scene to determine if an object of interest is present, said clutter suppression system comprising:

frame generation means for generating a series of frames of data where the frames of data represent images of the scene in which clutter is to be suppressed;

model storage means for storing model frames of the scene based on the series of frames of data, wherein the model frames of the scene are constructed when the object of interest does not exist in the scene;

clutter subspace means for generating a clutter subspace of the scene at a predetermined time from the model frames that defines substantially all of the clutter in the scene; and subspace projection means for generating frames of data of the scene in which substantially all of the clutter has been removed, said subspace projection means being responsive to the series of frames of data and the clutter subspace from the clutter subspace means, said subspace projection means measuring the clutter subspace and removing the clutter from the frames of data to generate substantially clutter free frames of data to be detected for the presence of the object, said subspace projection means being capable of removing clutter from the frames of data both prior to and later than the predetermined time the clutter subspace is generated by the clutter subspace means.

2. The clutter suppression system according to claim 1 further comprising centering means for centering the model frames of data, said centering means including pixel intensity averaging means for averaging the intensities of the pixels in the frames of data, said subspace projection means being responsive to centered pixel intensities of the model frames of data.

3. The clutter suppression system according to claim 1 wherein the clutter subspace means includes a Gram-Schmidt processing system that determines a set of clutter subspace unit vectors by a Gram-Schmidt procedure, wherein the unit vectors define the clutter subspace in the model frames.

4. The clutter suppression system according to claim 3 wherein the Gram-Schmidt processing system is responsive to centered pixel intensities from a centering means for centering pixel intensities of pixels in the model frames of data.

5. The clutter suppression system according to claim 3 wherein the Gram-Schmidt processing system determines the clutter subspace unit vectors by the relationship:

$$C_1 = \frac{\overline{S}_1}{\|\overline{S}_1\|} \, , \, C_i = \frac{\overline{S}_i - \sum_{j=1}^{i-1} C_j(C_j^T \overline{S}_i)}{\|\overline{S}_i - \sum_{j=1}^{i-1} C_j(C_j^T \overline{S}_i)\|}$$

where, $\overline{S}_i$ is a centered scene vector for time i in the model frames;

C is a unit vector for the clutter subspace;

i is an index corresponding to a time sample;

j is a summation index; and

T is a transpose operation.

6. The clutter suppression system according to claim 1 wherein the clutter subspace means includes a plane smoothing system that determines a set of clutter subspace unit vectors, said plane smoothing being responsive to the frames of data from the subspace projection means and the frames of data from the frame generation means so as to generate updated clutter subspace unit vectors in order to update the clutter subspace.

7. The clutter suppression system according to claim 6 wherein the plane smoothing system smoothes the rotation of the clutter subspace relative to an original clutter subspace as frames of data are added to the model frames by using a recursive filter approach.

8. The clutter suppression system according to claim 1 further comprising clutter sniffer means for determining the standard deviation of pixels in the model frames of data, said clutter sniffer means being responsive to pixel intensities in the model frames so as to generate the standard deviation of the model frames, wherein the standard deviation of each pixel is applied to a pixel threshold so that if the standard deviation of the pixel is below the pixel threshold the pixel is removed from the clutter subspace.

9. The clutter suppression system according to claim 1 further comprising glint threshold means for determining if pixels in the frames of data have an absolute intensity above a predetermined glint threshold, wherein if the pixel intensity is above the glint threshold the pixel is removed from the clutter subspace.

10. The clutter suppression system according to claim 1 further comprising object detection storage means and delay storage means, said object detection storage means storing current frames of data to be tested for the present of an object, said delay storage means storing past frames of data that include a detected object of interest, wherein the model storage means stores model frames of data that do not include the object.

11. The clutter suppression system according to claim 1 wherein the subspace projection means generates frames of data substantially free of clutter by the relationship:

$$\hat{\overline{S}}_{k+1} = \overline{S}_{k+1} - \sum_{i=1}^{k-1} C_i(C_i^T \overline{S}_{k+1})$$

where,

S is a centered scene vector in the model frames;

C is unit vector for the clutter subspace;

k is a time sample;

i is an index corresponding to a time sample; and

T is a transpose operation.

12. A clutter suppression system for suppressing clutter in an object detection system, said object detection system sensing a scene to determine if an object of interest is present, said clutter suppression system comprising:

a model storage device that stores model frames of the scene, wherein the model frames of the scene are constructed when the object of interest does not exist in the scene;

a Gram-Schmidt processing system being responsive to the model frames of the scene, said Gram-Schmidt processing system generating a set of clutter subspace unit vectors directly from the model frames that define a clutter subspace in the model frames where substantially all of the clutter in the model frames resides; and a subspace projection system that is responsive to frames of data of the scene and the clutter subspace unit vectors from the Gram-Schmidt processing system, said subspace projection system measuring the clutter subspace and then removing the clutter subspace from the frames of data to remove the clutter in the current frames of data.

13. The clutter suppression system according to claim 12 wherein the Gram-Schmidt processing system determines the clutter subspace unit vectors by the relationship:

$$C_1 = \frac{\overline{S}_1}{\|\overline{S}_1\|} \, , \, C_i = \frac{\overline{S}_i - \sum_{j=1}^{i-1} C_j(C_j^T \overline{S}_i)}{\|\overline{S}_i - \sum_{j=1}^{i-1} C_j(C_j^T \overline{S}_i)\|}$$

where, $\overline{S}_i$ is a centered scene vector for time i in the model frames;

C is a unit vector for the clutter subspace;

i is an index corresponding to a time sample;

j is a summation index; and

T is a transpose operation.

14. A clutter suppression system for suppressing clutter in an object detection system, said clutter detection system sensing a scene to determine if an object of interest is present, said clutter suppression system comprising:

a model storage device that stores model frames of data of the scene, wherein the model frames of the scene are constructed when the object of interest does not exist in the scene;

a plane smoothing system responsive to the model frames of data from the model storage device, said plane smoothing system determining a set of clutter subspace unit vectors that define a clutter subspace in the model frames, said plane smoothing system updating the clutter subspace by rotating the clutter subspace in a direction of a new model frame, said plane smoothing system controlling the amount of rotation of the clutter subspace to reduce the effects of random noise; and a subspace projection system responsive to the model frames of data and the clutter subspace unit vectors, said subspace projection system measuring the clutter subspace and then removing the clutter subspace from the frames of data to remove the clutter in the current frames of data.

15. The clutter suppression system according to claim 14 further comprising a Gram-Schmidt processing system that determines an original set of clutter subspace unit vectors by a Gram-Schmidt procedure.

16. The clutter suppression system according to claim 14 wherein the plane smoothing system controls the amount of rotation of the clutter subspace by allowing the rotation to be in proportion to the amplitude of the difference between the new model frame and its projection onto the clutter subspace.

17. The clutter suppression system according to claim 14 wherein the plane smoothing system controls the amount of rotation of the clutter subspace by allowing the rotation to be a fraction of an angle between the new model frame and the clutter subspace.

18. A method of suppressing clutter in an object detection system, said object detection system sensing a scene to determine if an object of interest is present, said method comprising the steps of:

providing a series of frames of data representing images of the scene in which clutter is to be suppressed;

using the frames of data to generate a series of model frames of the scene, wherein the model frames of the scene are constructed when the object of interest does not exist in the scene;

using the model frames of the scene to generate a clutter subspace at a predetermined time that defines substantially all of the clutter in the scene; and measuring the clutter subspace and removing the clutter subspace from the frames of data so as to remove substantially all of the clutter in the frames of data, said step of removing the clutter subspace including the capability of removing clutter from the frames of data both prior to and later than the predetermined time the clutter subspace is generated.

19. The method according to claim 18 further comprising the step of centering the model frames of data so as to provide centered pixel intensities of the model frames of data to be used by the subspace projection technique.

20. The method according to claim 18 wherein the step of generating a clutter subspace includes using a Gram-Schmidt process to determine a set of clutter subspace unit vectors that define the clutter subspace.

21. The method according to claim 18 wherein the step of generating a clutter subspace includes using a plane smoothing technique that determines a set of clutter subspace unit vectors that define the clutter subspace, said step of using a plane smoothing technique including smoothing the rotation of the clutter subspace as new frames are added to the model frames of data.

22. The method according to claim 18 further comprising the step of determining the standard deviation of the pixels in the model frames of data and applying the standard deviation to a clutter threshold to determine if the standard deviation of the pixels is below the clutter threshold, wherein if the standard deviation is below the clutter threshold the pixel is removed from the clutter subspace.

23. The method according to claim 18 further comprising the steps of determining if the pixels in the frames of data have an absolute intensity above a predetermined glint threshold, wherein if the pixel intensity is above the glint threshold the pixel is removed from the clutter subspace.

24. The method according to claim 18 further comprising the steps of testing current frames of data for a target and delaying the frames of data that are to be added to the model frames if a target is detected in the current frames of data.

25. A clutter suppression system for suppressing clutter in an object detection system, said object detection system sensing a scene to determine if an object of interest is present, said clutter suppression system comprising:

a system that generates a series of frames of data that represent images of the scene in which clutter is to be suppressed, each frame of data including a fixed number of pixels that define the image;

a storage device that stores model frames of the scene based on the series of frames of data where the model frames of the scene are constructed when the object of interest does not exist in the scene;

a system that generates a clutter subspace of the scene from the model frames of the scene where the clutter subspace defines substantially all of the clutter in the scene; and a subspace projection system that generates frames of data of the scene in which substantially all of the clutter has been removed, the subspace projection system being responsive to the series of frames of data and the clutter subspace from the clutter subspace system, said subspace projection system modelling the clutter subspace and removing the clutter from the frames of data to generate substantially clutter free frames of data to be detected for the presence of the object, wherein the clutter subspace is modelled as a set of gradient vectors for each pixel, said gradient vectors being relatively constant over a sequence of frames of data used to generate the model frames.

* * * * *